(12) United States Patent
Powell

(10) Patent No.: US 6,424,332 B1
(45) Date of Patent: Jul. 23, 2002

(54) IMAGE COMPARISON APPARATUS AND METHOD

(75) Inventor: Douglas H. Powell, Sacramento, CA (US)

(73) Assignee: Hunter Innovations, Inc., Sacramento, CA (US)

( * ) Notice: Subject to any disclaimer, the term of this patent is extended or adjusted under 35 U.S.C. 154(b) by 0 days.

(21) Appl. No.: 09/241,102

(22) Filed: Jan. 29, 1999

(51) Int. Cl.7 .................................................. G09G 5/00
(52) U.S. Cl. ........................... 345/156; 345/9; 345/173; 345/176
(58) Field of Search ................................. 345/173, 174, 345/175, 176, 156, 418, 765, 112, 113, 114, 115, 118, 121, 132, 9; 40/361; 382/284

(56) References Cited

U.S. PATENT DOCUMENTS

| 4,436,684 A | * | 3/1984 | White |
| 4,936,862 A | * | 6/1990 | Walker et al. |
| 5,007,936 A | * | 4/1991 | Woolson |
| 5,150,304 A | * | 9/1992 | Berchem et al. |
| 5,191,406 A | * | 3/1993 | Brandestini ................. 345/418 |
| 5,313,726 A | * | 5/1994 | Yaniv .......................... 40/361 |
| 5,347,295 A | * | 9/1994 | Agulnick .................... 345/156 |
| 5,360,446 A | * | 11/1994 | Kennedy |
| 5,370,692 A | * | 12/1994 | Fink et al. |
| 5,410,494 A | * | 4/1995 | Hashimoto et al. |
| 5,430,964 A | * | 7/1995 | Inbar ............................ 40/361 |
| 5,768,134 A | * | 6/1998 | Swaelens et al. |
| 5,769,078 A | * | 6/1998 | Kliegis |
| 5,781,652 A | * | 7/1998 | Pratt |
| 5,832,422 A | * | 11/1998 | Wiedenhofer |
| 5,940,167 A | * | 8/1999 | Gans ............................ 352/43 |
| 6,119,380 A | * | 9/2000 | Inbar ............................ 40/361 |

FOREIGN PATENT DOCUMENTS

| EP | 0574098 A1 | * | 1/1993 | |
| GB | 2193827 | * | 7/1987 | ............ G06K/9/22 |
| WO | WO 92/00045 | * | 1/1992 | |

\* cited by examiner

*Primary Examiner*—Matthew Luu
*Assistant Examiner*—Wesner Sajous
(74) *Attorney, Agent, or Firm*—Robert C. Hall; Bozicevic, Field & Francis, LLP.

(57) ABSTRACT

An image comparison apparatus and method for use in preoperative planning procedures which provides for superposition of a transparent medium with an image thereon, such as a medical x-ray, and a computer-interfaced display screen, and which allows a user to size, orient and spatially manipulate a digital image of on the display screen with respect to the superimposed medical transparency. A computer associated with the display screen periodically receives information updates for displayable images from product and advertising sources and electronic catalogs. The computer also transfers data to market services.

18 Claims, 5 Drawing Sheets

IMAGE COMPARISON APPARATUS AND METHOD

BACKGROUND OF THE INVENTION

1. Field of the Invention

This invention pertains generally to devices and processes for selecting, designing, modeling, correlating and scaling of superimposed images. More particularly, the invention is an image comparison apparatus and method for use in medical and dental pre-operative planning and post-operative analysis, which allows a medical transparency, such as an x-ray film, to be superimposed with a computer-interfaced display and held securely therewith, and which further allows a surgeon to quickly and easily manipulate a displayed digital implant image on the computer display in superposition with the medical transparency, for correlating, comparing, scaling, designing and selection of medical implants.

2. Description of the Background Art

The modern day orthopedic surgeon, in preparing for a hip transplant or like surgical procedure, generally completes the pre-operative planning process using inefficient and inaccurate techniques for selection of prosthesis for surgical implanting. Typically, a medical x-ray film image and light panel, together with a protractor, scale and pen or pencil, are the only items used by surgeons in selecting a prosthesis. The scale of the x-ray is estimated by using inaccurate markers exposed on the x-ray film. The surgeon sketches a series of circles, lines and angles directly onto the x-ray film and then uses the sketched features to make an estimation of the necessary prosthesis. This estimation is also relied on for selection of the instruments required for the surgery and evaluating the general complexity of the surgical procedure. This estimation process is sometimes aided by the use of a series of transparent templates which represent possible implant choices. The above procedure relies heavily on the experience and intuition of the surgeon making the estimations and is time consuming and prone to inaccuracy, and can result in non-optimal implant selection and unfavorable surgical outcomes.

Various pre-operative planning systems have been devised to improve efficiency and accuracy in choosing medical and dental implant and other prostheses. Such systems typically utilize digitized medical scan data (CT, NMR, x-ray) upon which computer-run algorithms are used to generate a prosthesis model. The digital model thus generated can then be scaled and manipulated with the digital scan data. These systems, however, are generally difficult and expensive to implement, and have proven to be incompatible with current pre-operative planning environments. Particularly, the software associated with such pre-operative planning systems is complex and unfamiliar to the surgeons planning operations, and thus additional personnel must be present to operate the systems. Even when such systems are available, the time and complexity involved result in surgeons being disinclined to utilize the systems.

Also known are hand-held measurement devices which can be set on top of an underlying image, such as a map, so that a user can look through the display and see a cursor point or points on top of the underlying image and can make a measurement of the underlying image by moving a cursor. Such hand-held measuring devices have proved to be limited in scope and application. Additionally, a user must typically hold the device in position with one hand, leaving only one hand free to enter data, make notes, or carry out other operations. The use of such hand-held measuring devices has been generally limited to "tabletop" applications wherein gravity can provide limited assistance in holding the measuring device in place.

Accordingly, there is a need for an image comparison apparatus and method which can be used for preoperative planning for medical implant design and selection, which allows a transparency and a displayed complex image to be assembled and held in a stationary relationship when comparisons are being made, which is quick and accurate, which is easy to implement and use, which is compatible with standard medical and dental preoperative planning environments, and which can be used directly by surgeons without any training or requiring additional personnel. The present invention satisfies these needs, as well as others, and generally overcomes the deficiencies found in the background art.

SUMMARY OF THE INVENTION

The present invention is an image comparison apparatus and method for use in medical implant design, scaling and selection, which allows quick and accurate comparison of a displayed image with a superimposed image on a transparency, which allows sizing and selection of implantable prosthesis for individuals, and which is compatible with current preoperative procedures and can be used directly by surgeons.

In general terms, the invention comprises a display, means for illuminating the display which are coupled to the display, means for superimposing a transparent medium with the display and holding the transparent medium, display and illuminating means in a stationary relationship, and a computer, operatively coupled to the display and including user interface means for inputting instructions to the computer. Program means, associated with the computer, provide for generating, displaying and manipulating digital images on the display according to input from said user interface means. The digital image is displayed in superposition with an image or images present on the transparent medium. The transparent medium may be interposed between the display and illuminating means.

By way of example, and not of limitation, the display may comprise generally any type of digital display having a plurality of pixels thereon which are responsive to a computer or like data processing means. More preferably, the display used with the invention comprises a transparent flat panel display, preferably an active matrix or passive matrix transparent LCD screen having a plurality of liquid crystal-based pixels, positioned between transparent conductors, with each pixel separately addressable by the computer. The transparent medium preferably comprises a flat transparency in the form of a flat, resilient sheet such as a medical x-ray film, and has thereon an image such as the x-ray image of a human joint.

The means for superimposing a transparent medium with the display and holding the transparent medium, display and illuminating means in a stationary relationship is preferably provided by a transparent back panel, associated with the illuminating means, which is pivotally coupled to the LCD screen along one edge. The pivotally coupled transparent panel and LCD screen are structured and configured to receive a flat transparency, such as a medical x-ray film, in between the back panel and the LCD screen in a "clamshell" arrangement. The transparency is placed in between the LCD screen and transparent panel when the LCD screen and transparent panel are in an open position, and the transparency, LCD screen and illuminating means are assembled and held together in a fixed position or stationary relationship when the LCD screen and transparent panel are in a closed position. The illuminating means preferably comprises a back light associated with transparent panel that is hinged to the LCD screen. Generally, the touch screen interface of the invention is coupled to and superimposed on LCD screen, and the superimposing means of the invention thus also provides means for releasibly holding the touch screen, as well as the transparent medium, display and illuminating means, in a stationary relationship.

The computer used with the invention may be any standard data processing means or system, and preferably comprises a conventional personal computer having RAM, ROM and input/output or I/O means for information transfer. The preferred user interface means comprise a "touch screen" interface which is superimposed with, and preferably integral to, the hinged LCD screen. The user interface means also preferably comprises a touch pad, which may be associated with a second LCD screen and illuminated by the back light. The touch screen and touch pad user interfaces are operatively coupled to the computer and allow a user to enter instructions to the computer. The user interface means may additionally or alternatively comprise a conventional keyboard and "mouse." The input/output or I/O means for uploading and downloading information to and from the computer are preferably comprise one or more floppy disc drives, optical computer disc or CD drives, a printer/facsimile machine, and network interface means in the form of a modem, "browser software" and telephone interface for accessing other computers and data bases. Means for providing and receiving market data services, means for receiving new product information, means for receiving advertising information, means for subscribing to and maintaining electronic catalogues or databases, means for monitoring product inventory and usage, and means for accessing manufacturer representative information, are preferably included with the invention, and are preferably associated with the computer.

The program means comprises software residing in the RAM and/or ROM of the computer, which carries out generally the operations of allowing a user to select a viewing mode, allowing a user to select a digital image type for display on the LCD screen, allowing a user to select a view (orientation) of the digital image, allowing a user to carry out primary and advanced spatial manipulations of the digital image, allowing a user to display and manipulate additional digital images, and allowing a user to record and export information regarding the displayed digital image.

The invention is particularly well suited for use in pre-operative planning processes for designing, scaling or selecting implants or prosthesis for subsequent use in surgery. In this regard, the program means of the invention also preferably comprises software which carries out the operations of pre-operative planning analysis, post-operative outcome analysis, compiling (non-confidential) patient data for transfer to market data services, accessing electronic catalogs and databases of implant and prostheses products, updating new implant and prostheses product information, the ordering and monitoring of implant or prosthesis inventory, receiving manufacturer advertising information, and requesting and receiving manufacturer information.

The backlight, LCD screen and computer of the invention are preferably embodied in an apparatus which is wall-mounted. The touch screen controls of the user interface are designed to intuitively allow a surgeon to generate, display and manipulate graphical representations of medical implants, together with the familiar scaling tools (protractor, ruler, sphere and cylinder), and to "draw" on the displayed implant image with a computer generated pen or pencil, in a manner similar to that used in current preoperative planning. In this manner, the invention is highly compatible with existing preoperative planning environments and is very user friendly to surgeons planning operation procedures.

In operation, the user of the invention, who will typically be a surgeon, places a medical transparency such as an x-ray film, in between the hinged LCD screen and transparent panel on the back light, and closes the LCD screen against the panel and back light to hold the medical transparency in place between the backlight and the LCD screen. When the LCD screen is closed against the panel, the touch screen, LCD screen, transparency and back light are assembled in superposition and held in a stationary relationship so that the transparency cannot undergo unwanted movement with respect to the LCD screen and the digital images displayed thereon. The backlight is activated to illuminate the superimposed medical transparency and LCD screen. Preferably, the back light is interfaced with or operatively coupled to the LCD screen so that the brightness level of the backlight can be adjusted by the user through touch pad or touch screen controls.

The touch pad and touch screen are used to select and display a digital graphical model or image of a medical implant on the LCD screen, and the user views the implant image and the superimposed image on the medical transparency. The user is provided with multiple implant selection levels or options via displayed pull down menus, and the user can select between various types and sources of medical implant graphical models, and may select different viewing modes for different types of medical transparency (x-ray film, MRI scan, CT scan, etc.). The user can expand/shrink, rotate, translate or otherwise spatially manipulate the displayed implant image on the LCD screen with respect to the superimposed medical transparency and the image thereon, using touchscreen, keyboard and/or mouse controls, until an exact size match, scale or correlation is acquired for the implant image with respect to the image on the superimposed medical transparency. The user can additionally display and manipulate tool images, such as a scaling ruler, protractor, electronic pen/pencil, or a sphere or cylinder of predetermined size, on the LCD screen, to facilitate the scaling of the implant image to the image on the superimposed medical transparency. The displayed implant image is compared or correlated to the underlying image on the medical x-ray, and the displayed image will generally go through one or more iterations of spatial manipulation via, translation, "zoom," and/or rotation.

Once the implant image has been "matched" or optimally scaled or correlated to the image on the medical transparency, the implant image and its dimensions, together with other information, are "saved" or stored on the computer, and may be printed or exported by downloading to a floppy disc or transferred via network communication to another computer. The stored information about the implant image may be supplemented by input from a physician for use in pre-operative planning and post-operative outcome analysis. If the implant image corresponds to an actual implant which is stored in inventory, the computer can perform an inventory update to note that a particular implant item is being selected for use and that a replacement implant item should be ordered or otherwise acquired to maintain the inventory. The computer can periodically monitor inventories of implant items corresponding to the displayable implant images, and advise users of the availability of such implants when image selections are made. The computer can also record and export non-confidential patient data to external market data services, communicate with remote "electronic catalogs" and new product data bases for updating the implant image selections for the user, and accessing advertising databases. The computer can also be used to contact an implant manufacturer representative via computer network to order an implant item corresponding to a selected implant image, or to allow a surgeon to ask questions to manufacturer representatives regarding possible implant selections An object of the invention is to provide an image comparison apparatus and method which allows graphical models or images of items such as medical implants to be displayed and manipulated in superposition to a transparent medium such as a medical x-ray.

Another object of the invention is to provide an image comparison apparatus and method which allows quick and easy interchangeable superposition of transparent media with a digital display.

Another object of the invention is to provide an image comparison apparatus and method allows for a superimposed display, transparent medium and back light to be releasibly assembled and held securely together in a stationary relationship so that the transparent medium will not undergo unwanted movement with respect to the display during comparison operations.

Another object of the invention is to provide an image comparison apparatus and method which does not require the user to hand-hold or hand-position a display with respect to an underlying transparency, and thus leaves both of the user's hands free for other work.

Another object of the invention is to provide an image comparison apparatus and method which is compatible with and quick and easy to use in standard medical and dental preoperative planning environments and post-operative outcome analysis environments.

Another object of the invention is to provide an image comparison apparatus and method which allows display and manipulation of tools commonly used in the design, scaling and selection of medical implants and prostheses.

Another object of the invention is to provide an image comparison apparatus and method which provides a user interface which can intuitively be used by surgeons without training.

Another object of the invention is to provide an image comparison apparatus and method which eliminates guesswork from the medical implant selection process and allows fast and accurate design, scaling and selection of medical implants.

Another object of the invention is to provide an image comparison apparatus and method which allows inventory updating and periodic inventory monitoring of implant items.

Another object of the invention is to provide an image comparison apparatus and method which provides electronic access to remote market data services, new product information, electronic catalogs and advertising materials.

Another object of the invention is to provide an image comparison apparatus and method which provides for contacting implant manufacturer representatives via computer network for ordering implant items or making inquiries regarding implant selections.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 7:
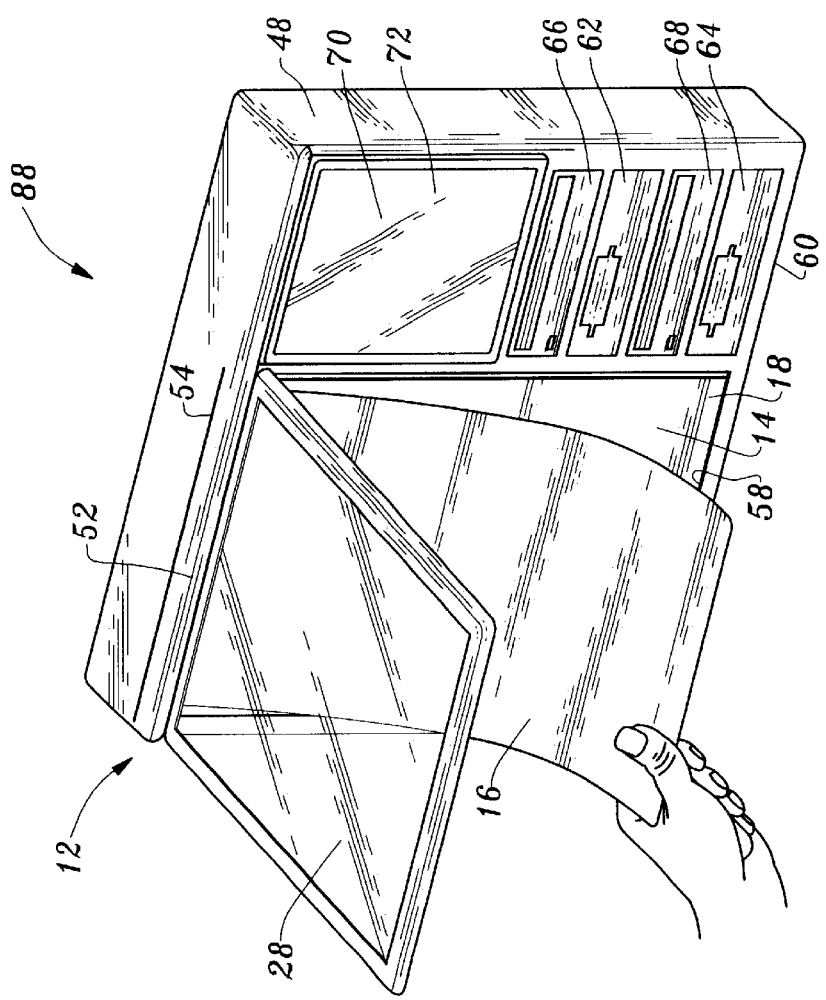
FIG. 7 is a perspective view of a third embodiment image comparison apparatus in accordance with the present invention.
Figure 8:
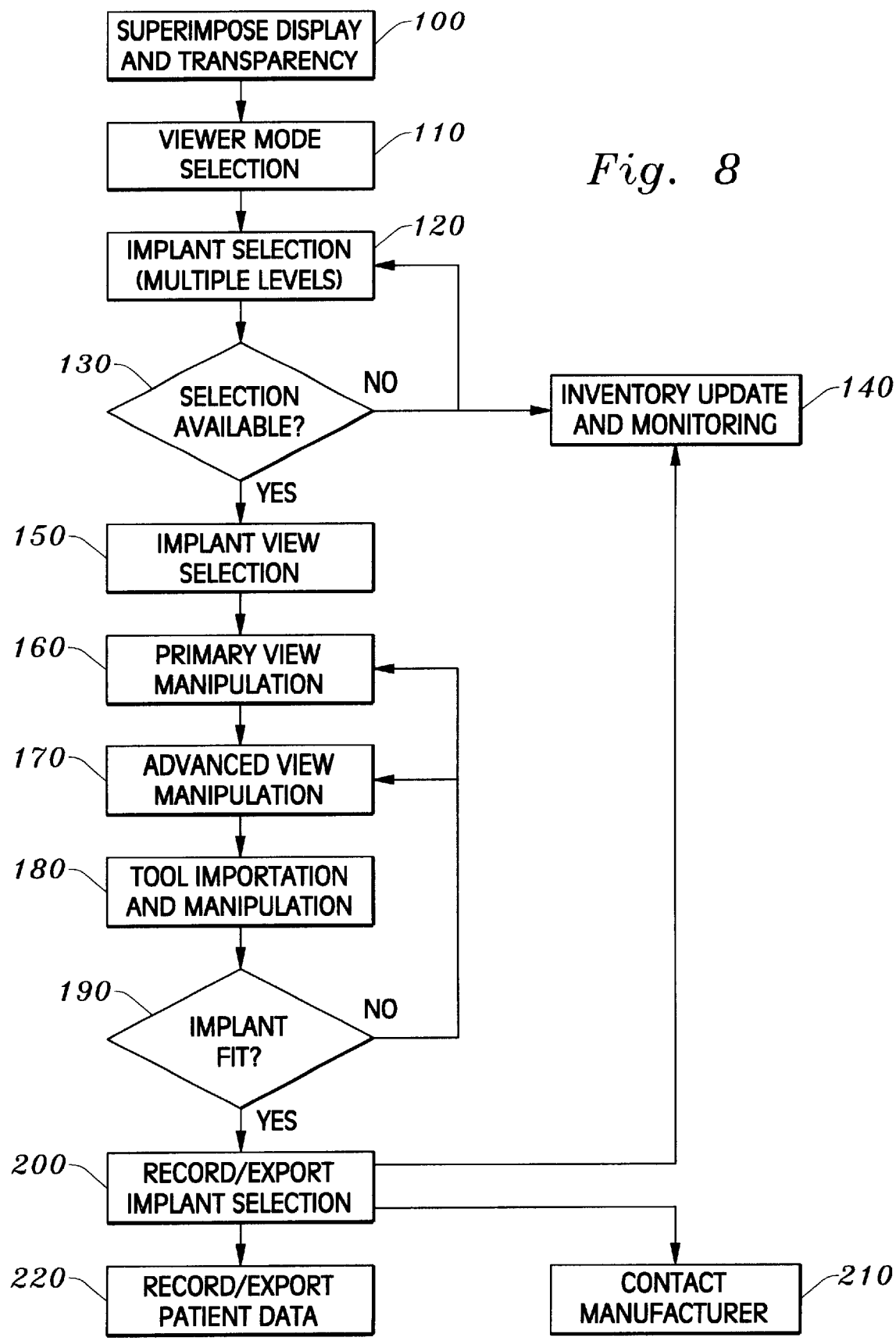
FIG. 8 is a flow chart showing generally the method of selecting and scaling a medical implant in accordance with the invention.

Referring more specifically to the drawings, for illustrative purposes the present invention is embodied in the apparatus shown generally in FIG. 1 through FIG. 7, and the method illustrated generally in FIG. 8. It will be appreciated that the apparatus may vary as to configuration and as to details of the parts, and that the method may vary as to details and the order of the steps, without departing from the basic concepts as disclosed herein. The invention is disclosed generally in terms of use with transparent media in the form of medical transparencies, and displayed digital images of medical implants, and particularly in terms of use with transparent x-ray film and displayed images of orthopedic implants. However, the particular uses of the invention as disclosed are merely exemplary, and it will be readily apparent to those skilled in the art that the invention may be used in various applications, including dental and medical applications, wherein a displayed image is scaled, compared, correlated or otherwise manipulated with respect to an image present on a superimposed transparent medium. The term "scaling" as used herein means generally the spatial manipulation, comparison, and correlation of a displayed image with respect to a superimposed second image. The term "implant" as used herein refers to all types of medical and dental implants, prostheses, grafts, orthoses, etc, including orthopedic implants. The term "display" as used herein means generally any type of display having a plurality of pixels associated therewith which are responsive to a computer or like digital data processing means.

Figure 1:
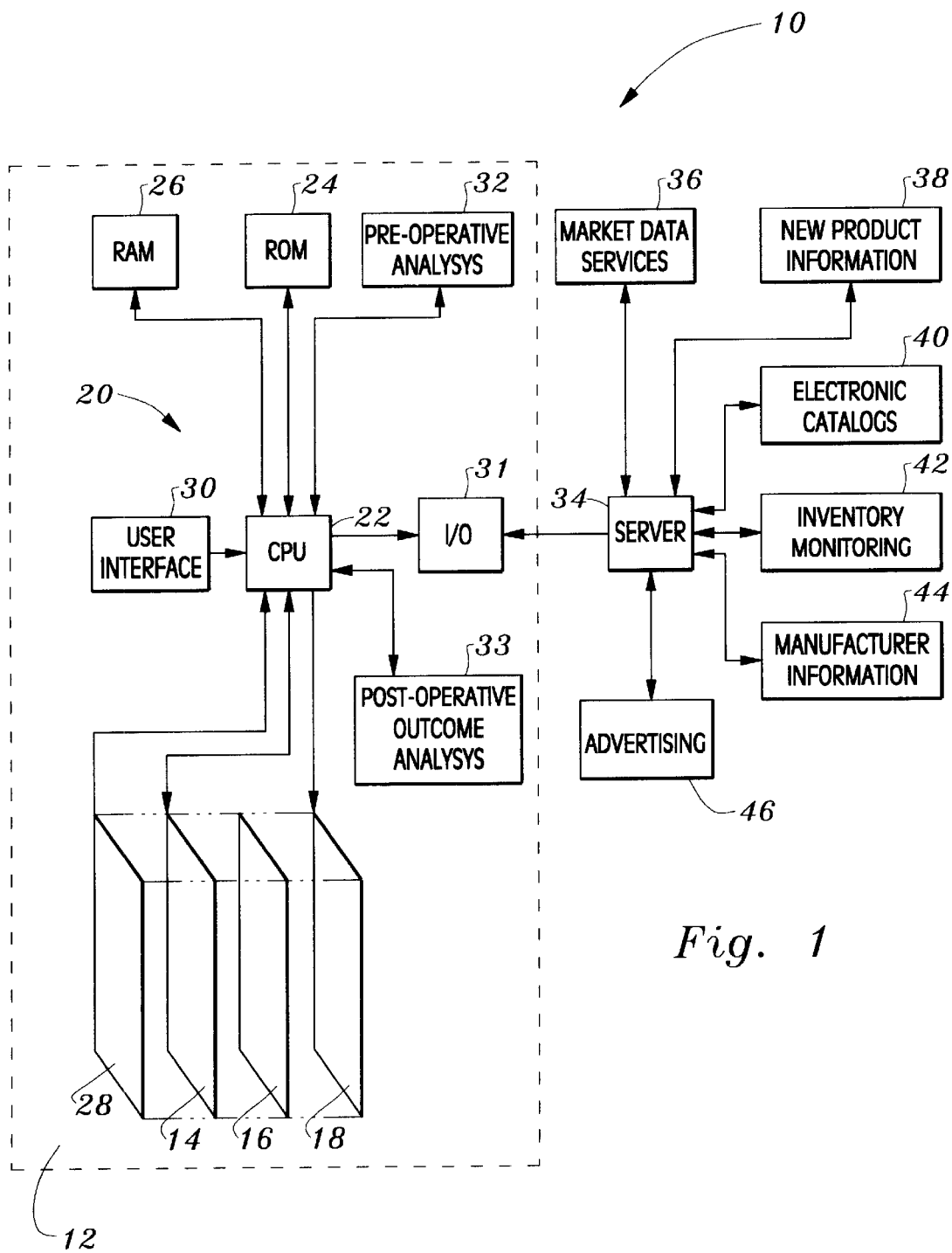
FIG. 1 is a functional block diagram of an image scaling system in accordance with the invention.

Referring first to FIG. 1, there is shown generally a functional block diagram of an image comparison system 10 and image comparison apparatus 12 in accordance with the present invention. The image comparison apparatus 12 includes means for superimposing a display and a transparent medium, as well as means for displaying and manipulating one or more digital images on the display. The display is preferably a flat panel display such as an LCD screen 14 of the type commonly used with personal computers, but may alternatively comprise a CRT, video monitor, or other conventional display means. LCD screen 14 has a plurality of pixels or picture elements (not shown) which are responsive to a digital computer for display of digital images in a conventional manner. The transparent medium is preferably a flat transparency, and is more preferably a substantially flat, thin, resilient transparency 16 such as a developed medical x-ray film having thereon an x-ray image of a bone, joint or like feature. Transparency 16 could alternatively comprise other types of medical images embodied in a transparent sheet, such as MRI and CT scanned images. Transparency further could be rigid or curved in shape rather than resilient and flat. Means for illuminating the superimposed LCD screen 14 and transparency 16 are provided by a back light 18 which is structured, configured and positioned to direct light through the superimposed LCD screen 14 and transparency 16.

The means for displaying and manipulating digital images on LCD screen 14 comprises a computer 20 having generally a central processing unit or CPU 22, conventional read only memory or ROM 24 and random access memory or RAM 26. Computer 20 and CPU 22 are operatively coupled to or electronically interfaced with LCD screen 14. The image displaying and manipulating means also comprises program means, in the form of software residing in RAM and/or ROM 24, 26, for carrying out operations on computer 20, as discussed further below.

User interface means for inputting instructions to computer 20 are also provided with the invention, and preferably comprise a generally transparent "touch screen" 28 associated with LCD screen display 14 and operatively coupled to or electronically interfaced with computer 20 and CPU 22. Additional user interface means, shown generally as user interface 30, described below, are also operatively coupled to computer 20 and CPU 22. Input/Output or I/O means for uploading and downloading information to and from computer 20 are shown as I/O devices 31. Program means for carrying out the operations of preoperative planning analysis 32 and post operative-outcome analysis 33 are included with computer 20.

I/O devices 31 include a network interface and modem line to allow computer 20 to interface with a server 34 via local area network, wide area network and/or the internet or "world wide web, so that computer 20 can communicate with remote data bases, computers and services shown generally as market data services 36, new product information 38, electronic catalogs 40, inventory monitoring 42, manufacturer information 44 and advertising 46, which are used in the preoperative planning analysis 23 and post-operative outcome analysis 33, as described in more detail below.

Referring now to FIG. 2 through FIG. 5, as well as FIG. 1, image comparison apparatus 12 is shown with a preferred structure and configuration for mounting on a wall (not shown). Image comparison apparatus 12 includes a generally rectangular housing 48 for back light 18, which houses fluorescent bulbs (not shown) or a like illumination source. Touch screen interface 28 is preferably a conventional touch screen such as those available from Microtouch, ® and is coupled to, and overlays LCD screen 14 and is responsive to pressure applied from a user's fingertips or a pointing device, or to pressure from a touch pen or illumination from a "light pen" (not shown). Touch screen 28, LCD screen 14, transparency 16 and back light 18 are all preferably maintained in a generally vertical orientation, rather than horizontal, for better compatibility with standard preoperative planning environments.

Transparency 16 is shown structured and configured as a conventional medical or dental x-ray film. Means for superimposing a transparency 16 with LCD screen 14, touch screen 28 and back light 28 and for releasibly holding transparency 16, LCD screen 14, touch screen and back light 18 in a stationary relationship, are preferably provided by a transparent panel 50 (FIG. 3) on back light 18, which is pivotally coupled to LCD screen 14 along a top edge 52 of housing 48 by hinges 53, so that LCD screen 14 can pivotally move with respect to panel 50 and back light 18 between an open position, shown generally in FIG. 2, and a closed position, shown generally in FIG. 3 and FIG. 1. LCD screen 14 and panel 50 are structured and configured to releasibly receive transparency 16 therebetween when in an open position, and to hold transparency 16, LCD screen 14 and back light 18 together in a static, stationary or otherwise positionally fixed relationship when LCD screen 14 is positioned in the closed position. In the closed position, back light 18 is positioned to direct illumination through transparency 16 and superimposed LCD screen 14 and touch screen 28. In the closed position, transparency 16 is enclosed between LCD screen 14 and back light 18. The superimposing and holding means further comprise a slot 54 in adjacent top edge 52 of housing 48 accommodates the top edge of transparency 16, and a lip 58 adjacent the lower edge 60 of housing 48 supports the lower edge of transparency 16, to further hold transparency 16 in place with respect to touch screen 28, LCD screen 14 and back light 18.

The means for superimposing transparency 16 with LCD screen 14, touch screen 28 and back light 28 and for holding transparency 16, LCD screen 14, touch screen and back light 18 in a stationary relationship may alternatively comprise an elongated slot arrangement (not shown) such that transparency 16 can be slidably positioned or enclosed between LCD screen 14 and panel 50 without requiring pivotal motion of LCD screen 14. In this arrangement, LCD screen 14 and back light 18 remain positionally fixed with respect to each other, while transparency 16 is slidably positioned between LCD screen 14 and back light 18. Once comparison operations are completed, transparency would then be slidably removed from between LCD screen 14 and back light 18.

In another possible arrangement, LCD screen 14 could be pivotally associated with panel 50 and back light 18 at one corner only, so that LCD screen 14 undergoes a rotational motion wherein LCD screen 14 remains generally co-planar with back panel 50, and moves in a clockwise or counter-clockwise manner between an open and closed position.

In still another arrangement, it is contemplated that LCD screen 14 may be movably coupled to panel 50 and back light 18 in an "accordion" fashion wherein LCD screen 14 moves outward and inward from panel 50 and back light 18 along an axis which is normal to panel 15, and wherein LCD screen remains generally parallel to panel during opening and closing motion. In this manner, when LCD screen 14 is separated from panel 50, transparency 16 may be inserted, and when LCD screen 14 is moved back against panel 50, transparency is held in superposition, in a static relationship, with LCD 14 (and touch screen 28) and back light 18. Various other arrangements for associated LCD screen 14 and touch screen 28 with back light 18, may suggest themselves to those skilled in the art, and are also considered as being within the scope of the present invention.

It is further contemplated that display 14 and transparency 16 could be superimposed by simply overlaying transparency onto display 14 and securely holding it thereon with releasible clips or clamps. This arrangement, however, is generally less preferred, as the transparency 16, when overlaying display 14, would then prevent the use of the touch screen feature 28 on display 14. Thus, the superposition of transparency 16 and display 14 will preferably involve an arrangement wherein LCD screen display 14 overlays transparency 16. Various other structural arrangements for superimposing transparency 16 with LCD 14, touch screen 28 and back light 18, and for holding transparency 16, LCD 14, touch screen 28 and back light 18 in a fixed or stationary relationship, will suggest themselves to those skilled in the art and are also considered to be within the scope of this disclosure.

The computer 20 of FIG. 1 is internal to housing 48 and thus is not shown in FIG. 2 through FIG. 5. Computer 20 is preferably a conventional "multimedia" personal computer, but may comprise any conventional data processing means. The I/O means 31 of FIG. 1 are shown generally as conventional magnetic floppy disc drives 62, 64, and conventional optical CD drives 66, 68, which allow information to be downloaded to computer 20 from conventional floppy discs and CDs (not shown) and uploaded from computer 20 to floppy discs and CDs. The I/O means 31 also comprises serial and/or parallel ports (not shown), on the back or bottom of housing 48, for connection to an external printer, and a network interface card and telephone connection (also not shown) for interfacing or networking computer 20 to server 34 (FIG. 1). The network card is preferably internal to housing 48, and the telephone connection is located on the bottom or back of housing 48.

The user interface means 30 of FIG. 1 is shown in FIG. 2 through FIG. 5 as a touch pad 70 which may be transparent and integral or coupled to a second LCD screen 72. Touch pad 70 and LCD screen 72 are operatively coupled to or interfaced with the computer internal to housing 48, and are illuminated by back light 18 in the same manner as LCD screen 14 and touch screen 28. The user interface means also may include a keyboard and mouse or joystick device (not shown) which can be operatively coupled to the internal computer of the apparatus 12.

Figure 2:
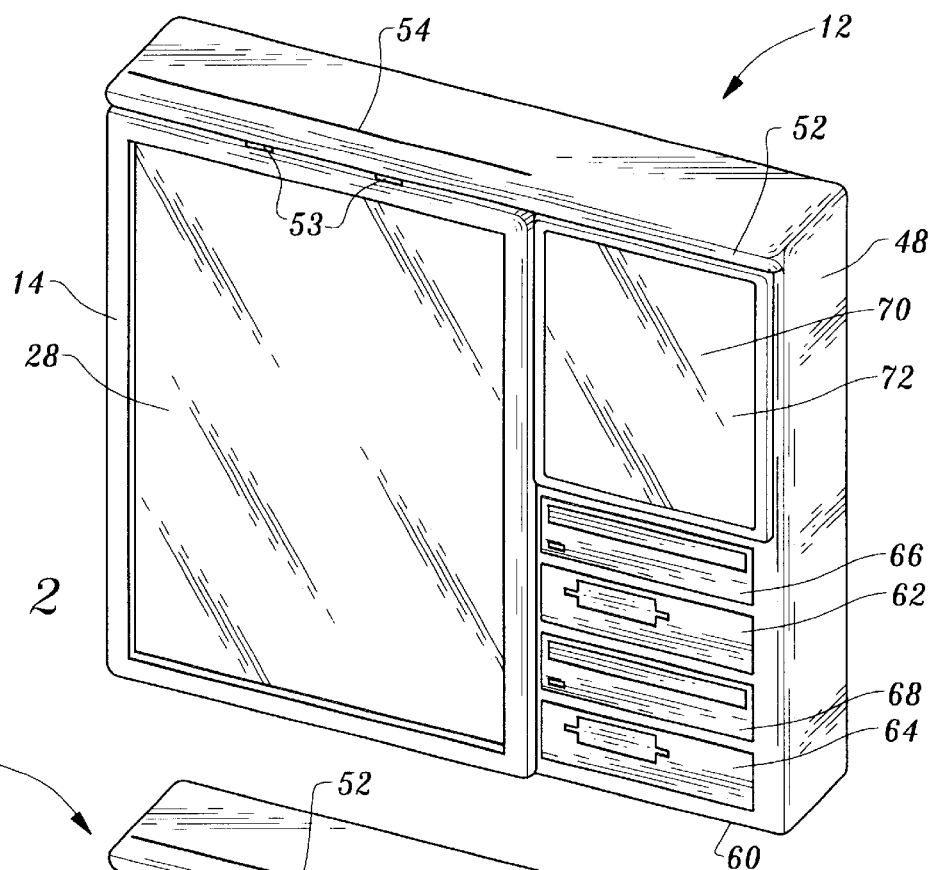
FIG. 2 is a perspective view of an image comparison apparatus in accordance with the invention.
Figure 3:
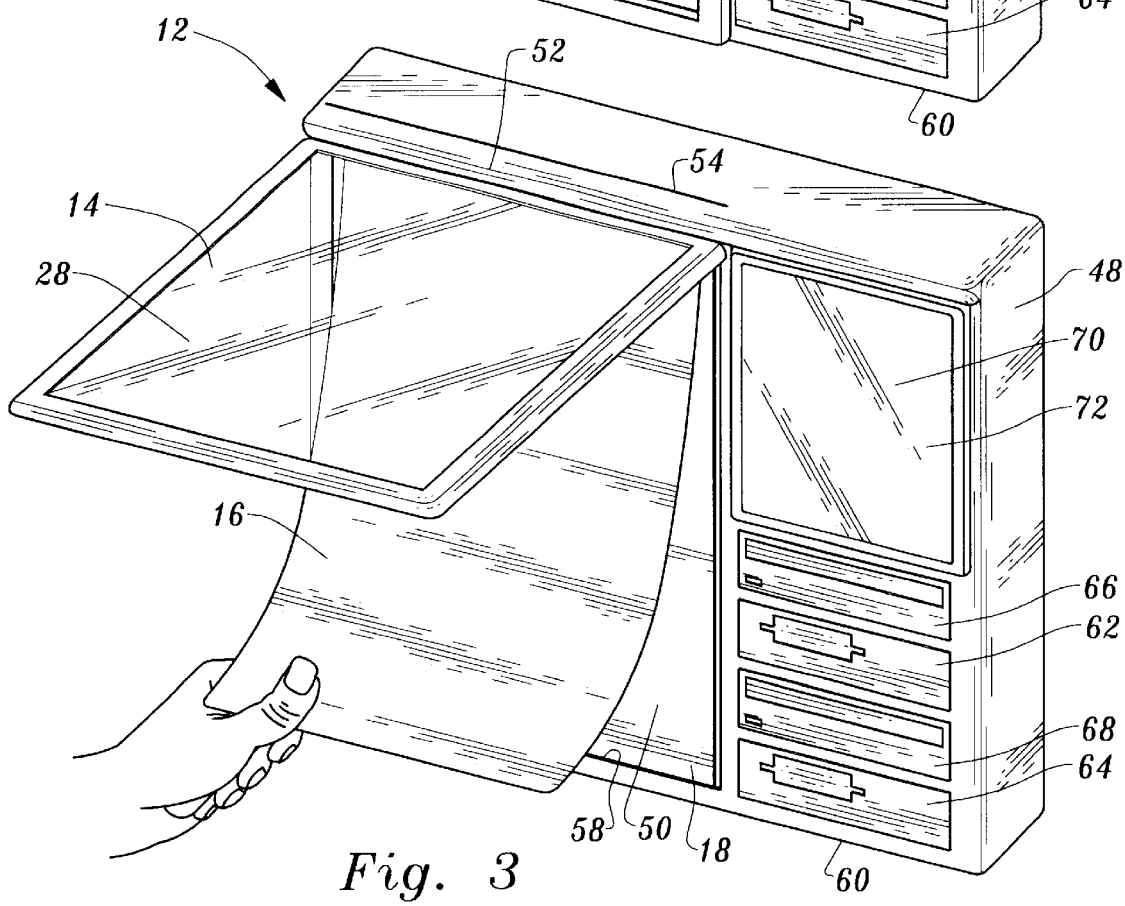
FIG. 3 is a perspective view of the image comparison apparatus of FIG. 2 shown with the hinged LCD screen pivoted to an open position and with a medical transparency being inserted.
Figure 4:
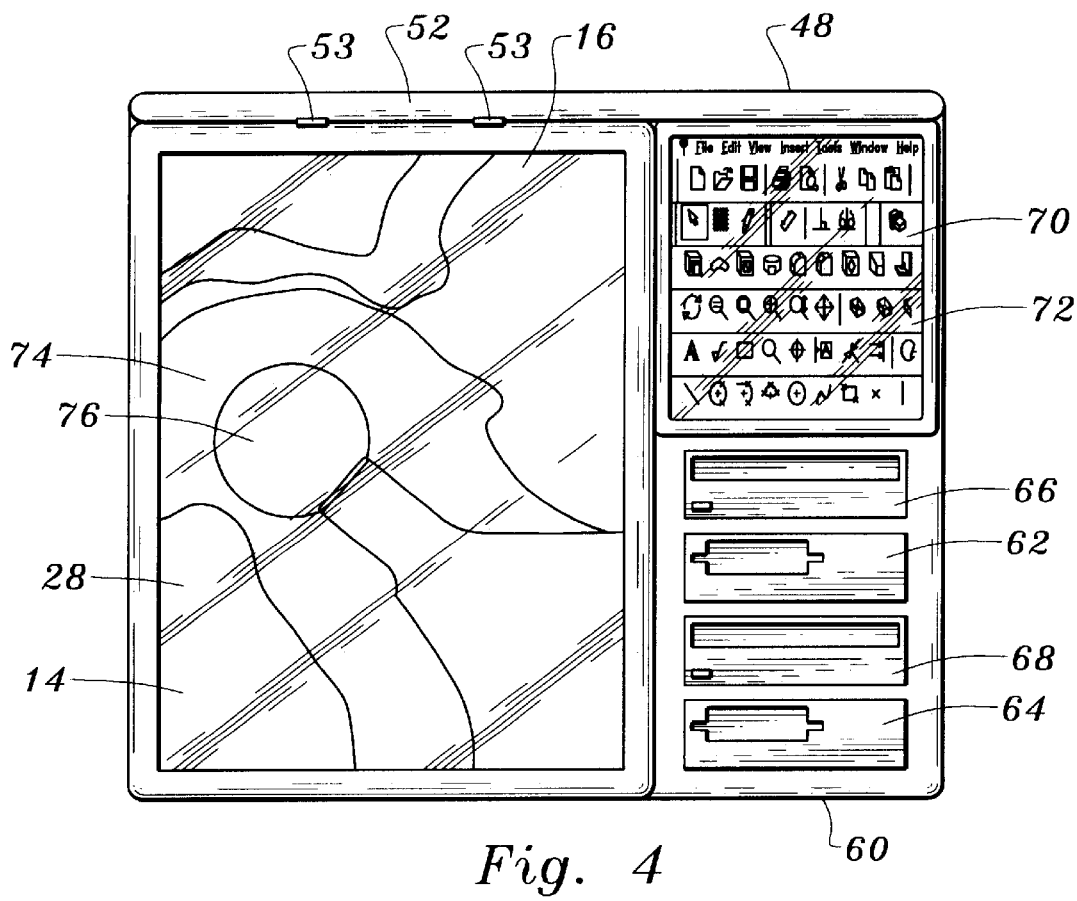
FIG. 4 is a front elevation view of the image comparison apparatus of FIG. 2 shown with the LCD screen in a closed position and with a medical transparency in superposition with the LCD screen and shown with interface icons on the touch pad.

In operation, a user will pivotally open LCD screen 14 and insert an x-ray transparency 16 between LCD screen 14 and transparent back panel 50 as shown in FIG. 2. The user places the top edge of transparency 16 within slot 54, places the bottom edge of transparency 16 on lip 58, and pivotally move LCD screen 14 to the closed position as shown in FIG. 4, to superimpose touch screen 28, LCD screen 14, transparency 16, and back light 18, with transparency 16 interposed between LCD screen 14 and back light 18. In the closed position, touch screen 28, LCD screen 14, transparency 16, and back light 18 define a superimposed assembly which is securely held in a static or stationary relationship, with touch screen 28, LCD screen 14, transparency 16, and back light 18 each being securely held in a fixed position. In this manner, potential unwanted movement of touch screen 28, LCD screen 14, transparency 16, or back light 18, which could interfere with subsequent image comparison or scaling operations, is avoided.

When the back light 18 is activated, the illumination thus provided allows a user to view through the superimposed touch screen 28, LCD screen 14 and transparency 16 to see an x-ray image 74 (FIG. 4) of a human hip on transparency 16, together with a superimposed digital image 76 of a human hip implant displayed on LCD screen 14. The superimposed implant image 76 may be spatially manipulated or otherwise altered in view on LCD screen 14 by the user according to instructions to computer 20 which are inputted via touch screen 28, touch pad 70 or other user interface input means, in the manner described below. Implant image 76 preferably comprises separate components, such as acetabular shell, femoral head, and stem (not shown) of a hip implant which may be independently spatially manipulated. The illumination also allows the user to see pull down menus 78 and icons 80 on touch screen 70 and LCD screen 72.

The means for generating, displaying an manipulating digital images on LCD screen display 14 preferably comprises program means for carrying out the operations of:

(a) allowing a user to select a viewing mode for LCD screen 14 and computer 20;

(b) allowing a user to select a type of digital image to be displayed;

(c) allowing a user to select a particular view of an digital image;

(d) allowing a user to perform spatial manipulations of the digital image on LCD display 14; and (e) allowing a user to generate, display and manipulate additional digital images, such as images of scaling tools, on LCD screen 14.

The program means of the invention are embodied in software which is stored in ROM 24 and/or RAM 26 of computer 20 and which operates responsively to user input from touch screen 28 and touch pad 70, as described further below. The software of the invention presents a viewer program, described in more detail below, which preferably operates out of a conventional computer operating system such as Windows 95®, Windows 98®, Windows NT®, Unix®, Linux™ or like commercially available operating system which is included in computer 20.

The program means for the viewing mode selection operation preferably comprises means for allowing a user to select one of a plurality of possible viewing modes. For example, there are preferably selectable viewing modes for x-ray transparencies, MRI transparencies, CT scans or other types of medical transparencies, which a user may select.

The program means for the digital image type selection operation preferably comprises multiple levels of selections, including:

(a) selection of implant images corresponding to different commercial sources of implants;

(b) selection of implant images according to surgical procedures such as hip replacement surgery;

(c) selection of images of particular implant components or parts; and (d) selection of implant images according to size.

The program means for the digital image view selection operation may include means for selecting front, back, side, top, bottom or various perspective views of an image. Preferably, the image view selection operation includes means for selecting image views corresponding to standard medical and dental x-ray absolute views, including:

(a) selection of an ML plane vertical view for an implant image;

(b) selection of an ML plane horizontal view for an implant image;

(c) selection of an AP plane vertical view for an implant image; and (d) selection of an AP plane horizontal view for an implant image.

Various other types of view selections may also be included with the program means of the invention.

The program means for the digital image spatial manipulation operation preferably comprises both:

(a) a primary or standard view manipulation selection, wherein generally large, crude spatial adjustments of the displayed image, or a portion of the displayed image, are made; and (b) an advanced view manipulation wherein the spatial positioning and orientation of the displayed image, or a portion thereof, are fine tuned or incrementally adjusted.

The program means for the primary and advanced view manipulation selections each may include:

(a) means for increasing and decreasing the size of the displayed image or a portion thereof;

(b) means for rotating the displayed image or a portion thereof with respect to one or more rotational axes; and (c) means for positionally translating or moving the displayed image or a portion thereof.

The means for increasing and decreasing the size of an image provides means for scale calibration of the image 76 on display 14 with respect to the image 74 on superimposed transparency 16. This operation allows scale calibration of a selected implant image with respect to the underlying medical x-ray. The means for rotating the displayed image preferably comprises allows a user to induce clockwise (CW) and counterclockwise (CCW) rotation of the displayed image with respect to an axis normal to LCD screen 14, a horizontal axis which is coplanar to LCD screen 14, and a vertical axis which is coplanar to LCD screen 14. The user can additionally have the option of selection of additional rotational axes, such as axes diagonal to LCD screen 14. The means for positionally translating the displayed image preferably comprises a conventional "click-and-drag" or "touch-and-drag" feature which allows a user to move an image about LCD screen 14.

The program means for the generation, display and manipulation of additional images operation preferably comprises means for generating and displaying graphical representations or digital images of conventional tools used by surgeons for scaling implants, including:

(a) means for displaying and positionally translating a protractor or goniometer;

(b) means for displaying and positionally translating a scaling ruler or caliper;

(c) means for displaying, sizing and positionally translating a sphere or hemisphere of selectable dimension;

(d) means for displaying, sizing and positionally translating one or more cylinders of selectable dimension; and (e) means for providing an "electronic pencil" for marking on LCD screen 14.

The digital images of the above tools may be displayed together with a displayed implant image in superposition therewith. The aforementioned program means may further comprise means for displaying and translating one or more cursor elements for aiding in making measurements or estimations of distances and angles. The cursor elements may be displayed simultaneously with, and in superposition with, the displayed implant image and tool images.

Figure 5:
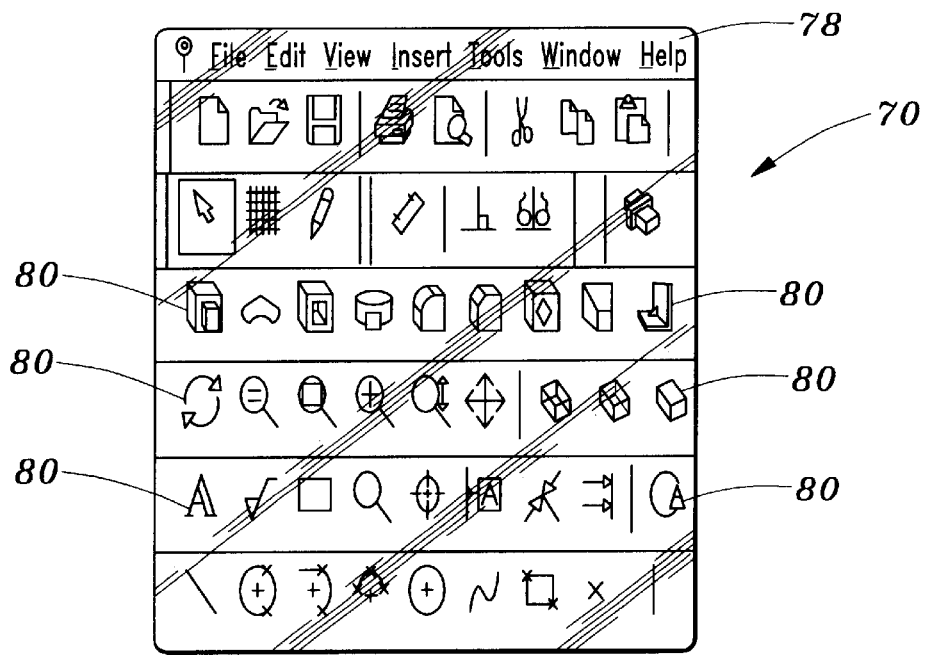
FIG. 5 is a front plan view of a touch pad user interface in accordance with the invention.

The program means of the invention are executed according to user instructions inputted to computer 20 via touch screen 28, touch pad 70, and/or keyboard, mouse or other input means. Referring more particularly to FIG. 5, there is shown a detail of touch pad 70 and underlying LCD screen 72. Touch pad 70 is shown with a row of conventional "pull down" menus 78, which may include, for example, a "File," "Edit," "View," "Insert," "Tools," "Window," and "Help" menus. The menus 78 as shown are merely exemplary and will generally vary according to particular uses of the invention. Pull down menus 78 are touch activated such that, when a user touches a particular menu topic, a pull-down menu (not shown) will descend or depend to display the user options associated with the software of the invention. Thus, pull down menus 78 may provide for touch activated spatial manipulation options for displayed digital images, such as enlargement or reduction of a displayed image, x-axis, y-axis and -axis rotation (CW and CCW) of a displayed image, translation or movement of a displayed image, selectable view options such as ML plane vertical, ML plane horizontal, AP plane vertical and AP plane horizontal, and selectable tool images such as the aforementioned protractor, ruler, sphere and cylinder.

Touch pad 70 and integral LCD screen 72 further comprises a plurality of touch-activated symbol icons 80 which may redundantly provide the same user options available in the pull down menus 78. Symbol icons 80 are graphical representations of options which intuitively represent to a user the options which are activated by touching the icons 80. Icons 80 thus allow touch activation by a user for spatial manipulation of displayed digital images, including enlargement or reduction, rotation, translation, view selection, and tool importation. The aforementioned description of menus 78 and icons 80 is merely exemplary, and will generally vary for particular uses of the invention. Various other types and arrangements of icons 80 and pull down menus 78 suggest themselves to those skilled in the art, and are considered to be within the scope of the present invention. Additionally, icons (not shown) may be included in association with LCD screen 14 and touch screen 28 to allow touch activation of similar user-selectable operations.

Preferably, the invention further comprises program means, associated with computer 20, for carrying out the operations of:

(a) updating and monitoring inventories of items corresponding to the images displayable on LCD screen 14, such as implants and components thereof;

(b) downloading to computer 20, via the network link of the I/O means 31, product information associated with items corresponding to the images displayable on LCD screen; and (c) uploading market service data to remote data bases via the network link of I/O means 31.

These programming means are embodied in software which resides in computer 20, and which are executed according to user input via touch screen 28, touch pad 70 or keyboard and mouse. Conventional "browser" software is also included with computer 20 to allow computer 20 to act as a "client" computer in a client-server relationship with remote server computer 34 via the network link and telephone interface of the I/O means 31. The browser software may be, for example, a commercially available program such as Microsoft® Explorer or Netscape®/AOL® Navigator, which allows computer 20 to locate and contact remote computers and for information generally to be downloaded from computer 20 to remote computers, and for information generally to uploaded to computer 20 from remote computers. These programming means provide data which may be used in pre-operative planning analysis 32 and post-operative outcome analysis 33 on computer 20.

The program means for the inventory updating and monitoring operation preferably includes:

(a) means for monitoring the availability of inventoried items, such as implants, corresponding to selected images;

(b) means for updating inventories of image selections which will result in usage or depletion of items, such as implants, corresponding to selected images; and (c) means for ordering or purchasing items, corresponding to selected images, from remote sources via the network link and telephone interface I/O means 31.

This operation allows computer 20 to automatically check on the inventory availability of a particular implant item when a user selects the implant image corresponding to the implant item. Also, when a user designates that the implant item corresponding to the implant image will be used or withdrawn from an inventory, the inventory updating and monitoring operation provides for updating the inventory list to note that an implant item will be used and that the inventory will be correspondingly depleted. These functions can be carried out by computer 20 or by a remote computer (not shown) via I/O means 31. Preferably, computer 20 maintains and updates and updates an internal inventory database of immediately available implant items which correspond to the selectable implant items. This information may be used in pre-operative planning analysis 32. Further, depleted implant items can be periodically purchased or ordered from manufacturers by computer 20 via I/O means and the internet. A "point-of-sale" charge or fee may be applied on a per-order or per-implant item basis in connection with inventory ordering over the internet via I/O means 31.

The product information downloading operation preferably comprises:

(a) means for accessing new product information, via I/O means 31, for implant products corresponding to displayable implant images;

(b) means for subscribing to and accessing electronic catalogs and databases, via I/O means 31, for implant products corresponding to displayable implant images;

(c) means for accessing or receiving advertising information corresponding to or associated with displayable implant images; and (d) means for contacting manufacturers or manufacturer representatives, via I/0 means 31, regarding items corresponding to displayable implant images.

The means for accessing new product information preferably includes icons (not shown) or "short-cuts" displayed on LCD screen 14 which, when touch activated, generate multimedia presentations for new implant or other medical product offerings or launches, shown as new product information 38 in FIG. 1, which notify surgeons of new product options directly by displayed icons on LCD screen 14. This information may be used in pre-operative planning analysis 32 and/or post-operative outcome analysis 33. These icons would preferably be available only for a limited time, and would periodically be updated and maintained via network interface and modem line through I/O means 31. A fee may be charged to implant manufacturers by the owner of apparatus 12 for allowing display of icons representing new products.

The means for subscribing to and accessing electronic catalogs allows access to remote lists, catalogs and databases, shown generally as electronic catalogs 40 in FIG. 1, which provide documentation, information, specifications and prices for commercially available medical implants and related medical products. This information may be used in pre-operative planning analysis 32 and post-operative outcome analysis 33. Icons (not shown) may be included on LCD screen 14 which, when touch activated, directly establish an on line connection via I/O means 31 and server 34 over the internet to electronic catalogs 40. As electronic catalogs 40 provide a form of advertising, maintenance or subscription fees may be charged to manufacturers of items in electronic catalogs 38 by the owner of apparatus 12 for maintaining access to electronic catalogs 38.

The means for accessing or receiving advertising information, shown generally as advertising 46 in FIG. 1, includes means for uploading to computer 20, via I/O means, advertising information for medical implants and related products. The advertising information may comprise a "screen-saver" adverting display (not shown) for LCD screen 14 wherein advertising information for a particular medical implant manufacturer is displayed on LCD screen 14 when LCD screen 14 and computer 20 are not in active use. The screen saver advertising would preferably be purchased in a manner similar to a magazine advertisement, wherein the medical implant advertiser pays a periodic fee to the owner of the apparatus 10 for maintaining the screen saver advertisement on LCD screen 14. The screen saver advertising is preferably downloaded to computer 20 via I/O means 31 and server 34 from manufacturer advertising 46, and the screen savers may be periodically modified or updated to include new advertising features. Advertising material in the form of icons or shortcuts (not shown) displayable on LCD screen 14 may also be downloaded to computer 20, with the advertising icons including trademarks, service marks or logos of medical manufacturers. The icons or shortcuts provide touch activated direct on-line access, via I/O means 31 and server 34, to advertising 36 of subscribing implant manufacturers.

The means for contacting manufacturers or manufacturer representatives, shown generally as manufacturer information 44 in FIG. 1, allows a user of the invention to automatically contact a manufacturer representative to inform the manufacturer representative that an implant made by that manufacturer has been selected for use in a surgical procedure, or to order an implant from the manufacturer for the surgical procedure or for inventory replacement. The term "manufacturer" as used herein refers generally to any provider of implants, including manufacturers and their marketers, sellers and dealers. Contacting manufacturer information 44 may involve touch-activated icons (not shown) on LCD screen 14, or may be carried out by facsimile transmission through the modem connection of I/O means 31. Once again, a fee for each such notification or order to the manufacturer representative may be charged.

The program means for the uploading market service data operation, preferably includes:

(a) means for compiling non-confidential patient information associated with selection of implant images and use of corresponding implant items; and (b) means for periodically uploading the patient information to remote market data services via I/O means 31 and server 34.

Physicians cannot disclose the personal information of patients, such as names, addresses or other identifying information. However, patient data such as age, sex, height, weight and the types, brands and sizes of implants utilized by such patients, and post-operative outcome results, can provide very valuable marketing information for implant and prosthetic manufacturers. The means for compiling patient data is preferably associated with post-operative outcome analysis 33 and generates and uses independent numeric identifiers so that the compiled patient data outcome data is non-confidential. The compiled non-confidential patient data is periodically uploaded to subscribing market data services 36, who pay a periodic fee for access to the non-confidential patient data.

Figure 6:
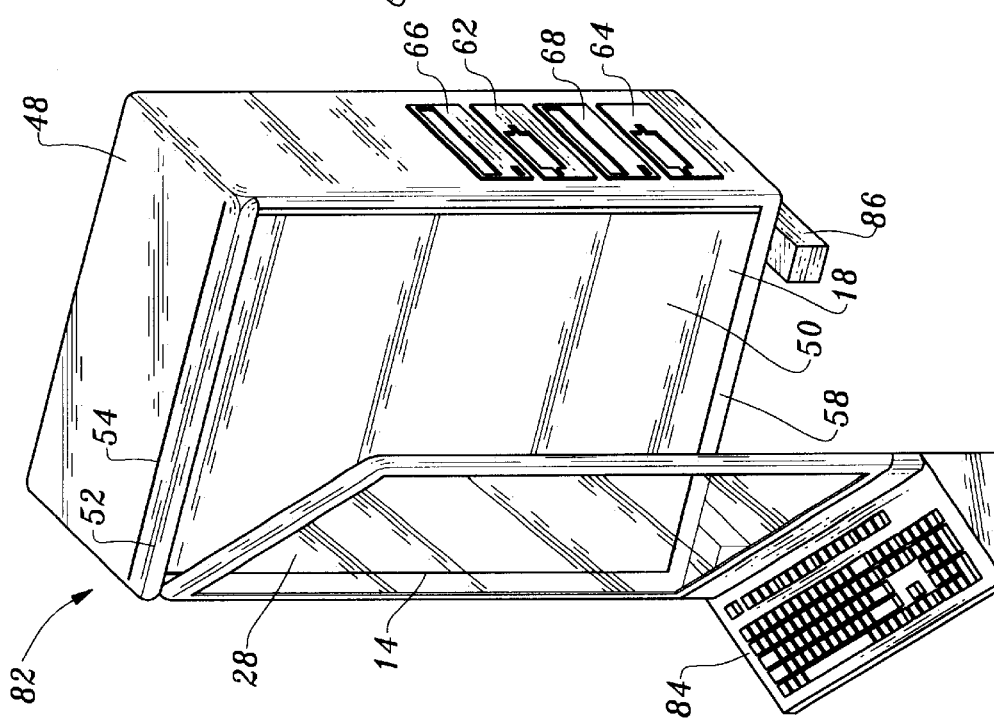
FIG. 6 is a perspective view of a second embodiment image comparison apparatus in accordance with the present invention.

Referring now to FIG. 6, a second embodiment image comparison apparatus 82 is shown, wherein like reference numbers denote like parts. The apparatus 82 has an internal computer (not shown) and a LCD screen 14 and integral touch screen 28 which are pivotally coupled to housing 48 along a side rather than at the top edge 52. A keyboard user interface 84 is coupled to LCD screen 14. Legs or supports 86 allow that apparatus 82 to sit on a desk top or table.

The image comparison apparatus 82, with the exception of being structured and configured to rest on a table via supports 86, and the provision of keyboard 84, otherwise operates in manner which is identical to that described above for image comparison apparatus 12. That is, a user pivotally opens LCD screen 14 and inserts an x-ray transparency (not shown) between LCD screen 14 and transparent back panel 50, by placing the top edge of the transparency within slot 54 and the bottom edge of the transparency on lip 58. LCD screen 14 is then pivotally closed to superimpose LCD screen 14 and the transparency, with LCD screen 14 overlying the transparency. User instructions are input to computer via keyboard 84, rather than by a touch pad as described above. As in the case of the apparatus 12, various other arrangements of the transparency superpositioning and holding means are possible for apparatus 82 in addition to the hinged arrangement shown in FIG. 6.

Referring now to FIG. 7, a third embodiment image comparison apparatus 88 is shown, wherein like reference numbers denote like parts. In the apparatus 88, LCD screen 14 is fixedly coupled to back light 18, and touch screen 28 is pivotally coupled to LCD screen 14. The apparatus 88 is used by pivotally opening touch screen 28 to insert transparency between touch screen 28 and LCD screen 14. When touch screen 28 is pivotally closed, transparency 16 is superimposed with touch screen 28, LCD screen 14 and back light 18, and touch screen 28, transparency 16, LCD screen 14 and back light 18 are assembled and held together in a stationary or static relationship with respect to each other. Apparatus 88 differs from apparatus 12 in that transparency 16 is interposed between touch screen 28 and LCD 14, rather than between LCD screen 14 and panel 50 of back light 18. In all other respects, the apparatus 88 operates in a manner which is generally identical to that described above for image comparison apparatus 12. The apparatus 88 could be modified such that touch screen 28 was fixedly positioned with respect to LCD screen 14, with transparency 16 being slidably interposed therebetween. Alternatively, touch screen 28 could be movably coupled to LCD screen 14 in an accordion fashion or other movable arrangement which provides for placing and holding transparency 16 between touch screen 28 and LCD screen 14.

The method and operation of the invention will be more fully understood by reference to the flow chart of FIG. 8, as well as FIG. 1 through FIG. 5. The order of the steps as shown in FIG. 8 and described below is only exemplary, and should not be considered limiting.

At step 100, a transparent medium in the form of a physical transparency 16, and a display such as LCD screen 14 are superimposed and held together in a stationary relationship. This step is generally carried out using the image comparison apparatus 12 in the manner described above, i.e., a user pivotally opens LCD screen 14 and inserts an x-ray transparency 16 between LCD screen 14 and transparent panel 50, with the top edge of transparency 16 positioned within slot 54 and the bottom edge of transparency 16 positioned on lip 58. LCD screen 14 is then pivotally moved to the closed position to superimpose LCD screen 14 and transparency 16, with LCD screen 14 overlying transparency 16 to assemble and secure LCD screen 14 (and touch screen 28), transparency 16 and back light 18 in a generally fixed, positionally stationary relationship with respect to each other.

Step 100 also generally includes the step of activating and/or adjusting back light 18 to provide illumination through the superimposed LCD screen 14 and transparency 16. When the back light 18 is activated, the illumination thus provided allows a user to see the x-ray image 74 of a human hip on transparency 16, together with a superimposed digital image 76 of a human hip implant displayed on LCD screen 14, as discussed further below. Since the exposure of different x-ray transparencies 16 will vary, the illuminating intensity of back light 18 can preferably be varied by a touch activated control on touch pad 70. Generally, back light 18 will always be on at some level, even when the apparatus 12 is not in use, in order to illuminate LCD screen 14 so that the advertising screen-saver discussed above will be visible.

Also in step 100, the user generally opens or initiates the programming associated with the invention for selecting, displaying and manipulating images, by touch activating an icon (not shown) on LCD screen 14, to open a viewer window (not shown) on LCD screen 14 which may additional icons to prompt the user through subsequent steps. At this point, the user will also generally start the pre-operative analysis 32 by recording, in the memory of computer 20, a patient file or case number, the name of the case surgeon, the name of the patient, the type of x-ray film transparency 16, its absolute view (e.g., AP) and any identifying case codes or numbers for the x-ray film, the joint or anatomy involved in the case, and any other pertinent information required. If the magnification of the x-ray transparency 16 is known, it may be entered on computer 20 at this point. At step 110, the user selects a view mode for LCD screen 14. As noted above, the invention may be used with a variety of types of transparencies, including x-ray, MRI and CT scan transparencies. In step 110, the user, for example touch-activates an option provided by pull down menus 78 or icons 80 on touch pad to select a viewing mode such as, for example, an "x-ray mode", "MRI mode" or "CT scan mode" (not shown). In the case of using the invention with an x-ray film transparency, the user would select a mode corresponding to viewing of an x-ray film. Activation of a selected view mode will structure, configure or otherwise shape the view window in the optimum fashion for the mode selected. The selection of a particular view mode may also result in display of different icons in the viewer window than are provided in different view modes.

At step 120, the user carries out several levels of implant image selections. There are preferably four main levels of implant image selection, as noted above, which comprise (a) selection of implant images corresponding to different commercial implant sources;

(b) selection of implant images according to surgical procedures;

(c) selection of images of particular implant components or parts; and (d) selection of implant images and implant components according to size.

The above selections are preferably made sequentially by the user according to touch-activated icons or prompts on LCD screen 14 and/or through touch-activated pull down menus 78 and icons 80 on touch pad. Thus, a particular implant manufacturer is first selected, followed by selection of a type of implant such as a hip implant. Following selection of a hip implant, selection of images of particular implant parts, such as acetabular shell, acetabular shell insert, femoral head, stem and/or collar components. Following selection of the above implant component, size selections of each of the individual implant components may be made. The information regarding the above selections is recorded by computer 20 for use in pre-operative planning 32 and postoperative outcome analysis 33.

The selection of images by commercial sources in step 120 preferably utilizes touch activated icons which display trademarks, logos or advertising features of the particular commercial supplier. The user may alternatively be prompted for making the above implant image selections by display of a field on LCD screen 14 in which the user enters identifying words or phrases via keyboard input. Selection of an implant image in step 120 results in display of a digital image 76 of the selected implant on LCD screen 14. The absolute view and position of the displayed implant image 76 are subsequently selected or adjusted in subsequently described steps.

At step 130, computer 20 makes a query as to the availability for surgery of the implants corresponding to the implant image selections made in step 120. A periodically updated implant inventory database in computer 20 is reviewed by the inventory updating operation, to determine if the implant corresponding to the selected implant image is immediately available. If the selection is immediately available for surgery, step 150 is carried out. If the selection is not available, inventory updating 140 may be carried out to record the deficiency in the selected implant, and the user may be prompted on LCD screen 14 to either make an alternate selection by carrying out step 120 again, or to move on to step 150 even though the implant item corresponding to the selected implant image is not available in inventory. The step of contacting a manufacturer and ordering the implant item according to the selection, which is described below, may also be carried out at this point.

At step 150, the user selects an absolute view of the implant image selected in step 120. In the case where a viewer mode for medical x-rays has been selected in step 110, the absolute view selections in step 150 will preferably include (a) selection of an ML plane vertical view;

(b) selection of an ML plane horizontal view;

(c) selection of an AP plane vertical view; and (d) selection of an AP plane horizontal view.

The user makes the view selections according to touch-activated prompts provided on LCD screen 14 and touch screen 28 and/or the touch activated pull down menus 78 and icons 80 of touch pad 70 and LCD screen 72. The selection is made according to the absolute view of the x-ray image 74 on transparency 16, and is recorded by computer 20 and may be used in preoperative analysis 32 or post-operative planning 33.

At step 160, the user carries out initial or primary view or spatial manipulations to position and size implant image 76, or components thereof, on LCD screen 14 with respect to the underlying x-ray image 74 on transparency 16. The spatial or view manipulations preferably include:

(a) increasing and decreasing the size of the displayed implant image or components thereof;

(b) rotating the displayed image or components thereof with respect to one or more rotational axes; and (c) positionally translating or moving the displayed image or components thereof.

Increasing and decreasing the size of the implant image or implant component image are provided by a conventional "zoom" feature which allows enlargement or reduction of the implant image, or a selected component of the implant image, according to touch activated commands inputted via touch pad 72 and LCD screen 70, or touch screen 28 and LCD screen 14. Clockwise (CW) and counterclockwise (CCW) rotation of the displayed implant image, or a selected part or component of the implant image, can preferably be carried out about three Cartesian (right angled) axes, with one axis of rotation being normal to LCD screen 14, one axis of rotation coplanar with and vertically oriented in LCD screen 14, and one rotational axis being coplanar with and horizontally oriented in LCD screen 14. The "zoom" and rotation operations can be touch-activated via pull down menus 78 or icons 80 on touch pad, or by touch-activated icons displayed on LCD screen 14. The positional translation of the implant image may be carried out by a "touch-and-drag" feature wherein the user touches the implant image 76 on LCD screen 14 with a finger or instrument and moves the finger or instrument in a desired direction, without breaking contact or reducing touch pressure with screen. The positional translation operation may also be carried out using pull down menus 78 or icons 80 on touch pad 70.

At step 170, the user carries out a more advanced spatial manipulation of the displayed implant image or a component of the implant image. This step is generally carried out once an approximate positioning of implant image 76 with respect to x-ray image 74 is achieved in step 160. This step is initiated by touch activating an appropriate icon or pull down menu which increases or enhances the sensitivity of each of the size increasing/decreasing, CW and CCW rotation, and positional translation procedures described above in step 160, so that each such spatial adjustment is carried out in smaller increments than in step 160. In this manner, a final positioning and orientation of implant image 76 with respect to x-ray image 74 is achieved. Spatial manipulation of the entire implant image may be carried out, or separate spatial manipulation of individual components of the displayed implant image may be carried out. For example, in the case of a hip implant, spatial manipulation of the acetabular shell, shell insert, femoral head, stem and/or collar may be carried out separately.

At step 180, the user may import and display one or more tool images, including a protractor image, scaling ruler image, sphere image and/or cylinder image (not shown) on LCD screen. The tool images are activated or imported by touch-activated prompts provided on LCD screen 14 and/or the touch activated pull down menus 78 and icons 80 of touch pad 70. The tool images can be positionally translated on LCD screen 14 by a click-and-drag or touch-and-drag feature similar to that described in step 160. An electronic pen may also be imported in this step, using touch pad 70 or LCD screen 14 prompts, so that the user may "draw" on LCD screen 14. The absolute size of the sphere and cylinder can be selected by the user according to prompts on LCD screen 14 or touch pad 70.

At step 190, the user makes a query as to whether a final implant fit has been achieved, i.e., whether or not the implant image 76 and/or its individual components are optimally sized, oriented and positioned with respect to x-ray image 74. If not, step 160 or 170 may be repeated for additional size, orientation and/or positional adjustment of implant image 76 and its components. If implant image 76 is optimally matched or correlated to x-ray image 74, step 200 is carried out.

At step 200, the dimensional information for implant image 76 and its components, as well as the commercial source and other information for the actual implant corresponding to implant image 76 are recorded or stored on computer 20. In the case of a hip implant, for example, the size or dimension of the acetabular shell, shell insert, femoral head, and stem and collar size, together with the commercial source(s) and patient and case information. This information may be used in pre-operative planning analysis 32 and post-operative outcome analysis 33, together with other information or observation that a physician may want to record. The user may, at this step, carry out the inventory update step 140 to note in the inventory data base that an implant present in the inventory will be withdrawn and used for surgical implant. The dimensional and other information of the final implant image may additionally be exported or uploaded via I/O means 31 and server 34 to , followed by step 210. At this point, comparison of displayed implant image 76 and the underlying x-ray image 74 is generally completed, and LCD screen 14 may be pivotally opened and x-ray transparency 16 removed.

At step 210, an implant manufacturer may be contacted to order an implant part corresponding to the implant image which was selected and sized in the aforementioned steps. A touch-activated icon on LCD screen 14 preferably creates a direct on line connection to the selected manufacturer so that this step can be carried out. The information recorded in step 200 is then exported via I/O means 31 and server 34 to the implant manufacturer.

The step of recording and exporting patient data 220 to market data services 36 may additionally be carried out at this point. The programming described above formats patient data in a non-confidential format and periodically uploads the information via I/O means 31 and server 34 to market data services 36 in the manner described above.

Accordingly, it will be seen that this invention provides an image comparison apparatus and method for use in medical implant design, scaling and selection, which allows quick and accurate sizing and selection of implantable prosthesis for individuals, and which is compatible with current pre-operative procedures and can be used directly by surgeons. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. An apparatus for comparing dynamic digital images with a medical transparency having an image thereon, comprising:
   (a) a liquid crystal display screen, said liquid crystal display screen having a plurality of pixels;
   (b) a touch screen, said touch screen coupled to said liquid crystal display screen;
   (c) a back light, said liquid crystal display screen coupled to said back light;
   (d) a transparent panel, said transparent panel joined to said back light, said transparent panel movably coupled to said liquid crystal display screen;
   (e) said transparent panel and said liquid crystal display screen structured and configured to receive said medical transparency therebetween when said liquid crystal display screen and said transparent panel are in an open position;
   (f) said transparent panel and said liquid crystal display screen structured and configured to hold said medical transparency therebetween in a fixed position and to maintain said medical transparency, said liquid crystal display screen and said back light in a stationary relationship when said liquid crystal display screen and said transparent panel are in a closed position;
   (g) a touch pad, said touch pad associated with said back light;
   (h) a computer, said computer operatively coupled to said liquid crystal display screen, said computer operatively coupled to said touch screen, said computer operatively coupled to said touch pad, said pixels of said liquid crystal display screen responsive to said computer; and
   (i) program means, associated with said computer, for generating, displaying and manipulating a digital image of a medical implant on said liquid crystal display screen according to input from said touch screen and said touch pad.

2. An apparatus for comparing dynamic digital images with a medical transparency having an image thereon as recited in claim 1, wherein said assembling means further comprises means for retaining said medical transparency in between said touch screen and said liquid crystal display screen.

3. A apparatus for comparing dynamic digital images with a medical transparency having an image thereon as recited in claim 1, wherein said program means further comprises means, responsive to input from said touch screen and said touch pad, for carrying out the operations of:
   (a) allowing a user to select a viewing mode;
   (b) allowing a user to select a digital medical implant image;
   (c) allowing a user to select a view of said selected digital medical implant image;
   (d) allowing a user to perform spatial manipulations of said selected digital medical implant image with respect to said liquid crystal display screen; and
   (e) allowing a user to generate, display and manipulate digital tool images on said liquid crystal display screen.

4. An apparatus for comparing dynamic digital images with a medical transparency having an image thereon as recited in claim 1, further comprising:
   (a) program means, associated with said computer, for carrying out the operation of preoperative planning analysis; and
   (b) program means, associated with said computer, for carrying out the operation of postoperative outcome analysis.

5. An apparatus for comparing dynamic digital images with a medical transparency having an image thereon as recited in claim 1, further comprising:
   (a) program means, associated with said computer, for carrying out the operation of updating and monitoring an inventory of medical implant items corresponding to said digital medical implant image displayed on said liquid crystal display screen;
   (b) program means, associated with said computer, for carrying out the operation of downloading, to said computer, product information associated with said digital medical implant image displayed on said liquid crystal display screen; and
   (c) program means, associated with said computer, for carrying out the operation of uploading market service data from said computer.

6. A apparatus for comparing dynamic digital images with a medical transparency having an image thereon as recited in claim 1, wherein said program means for carrying out the operation of allowing a user to perform spatial manipulations of said selected digital medical implant image further comprises program means for allowing a user to:
  (a) translate said selected digital medical implant image with respect to said liquid crystal display screen;
  (b) enlarge and reduce said selected digital medical implant image with respect to said liquid crystal display screen; and
  (c) rotate said selected digital medical implant image about at least one rotational axis with respect to said liquid crystal display screen.

7. An apparatus for comparing dynamic images with a transparency having an image thereon, comprising:
  (a) a display, said display having a plurality of pixels;
  (b) means for illuminating said display, said display coupled to said illuminating means;
  (c) means for superimposing said transparency with said display and for holding said transparency, said display, and said illuminating means in a stationary relationship, with said transparency interposed between said display and said illuminating means, said superimposing means comprising means for retaining said transparency in between said touch screen and said display and for maintaining said touch screen, said display, said transparency and said illuminating means in a stationary relationship;
  (d) a computer, said computer operatively coupled to said display, said computer including a touch screen, said touch screen superimposed with said display, said pixels on said display responsive to said computer;
  (e) program means, associated with said computer, for generating, displaying and manipulating a digital image on said display according to input from said user interface means, said digital image on said display in superposition with said image on said transparency.

8. An apparatus for comparing dynamic digital images with a transparency having an image thereon as recited in claim 7, wherein said superimposing means comprises:
  (a) a transparent panel, said transparent panel coupled to said illuminating means, said transparent panel coupled to said display; and
  (b) said transparent panel and said display structured and configured to receive said transparency between said transparent panel and said display and to hold said transparency, said display and said illuminating means in a positionally fixed relationship with respect to each other.

9. An apparatus for ,comparing dynamic digital images with a transparency having an image thereon as recited in claim 7, wherein said program means further comprises means, responsive to input from said user interface means, for carrying out the operations of:
  (a) allowing a user to select a viewing mode for said display;
  (b) allowing a user to select a digital image for display on said display;
  (c) allowing a user to select a view of said selected digital image on said display;
  (d) allowing a user to perform spatial manipulations of said selected digital image on said display with respect to said image on said transparent medium; and
  (e) allowing a user to generate, display and manipulate additional digital images on said display.

10. An apparatus for comparing dynamic digital images with a transparency having an image thereon as recited in claim 9, wherein said program means for carrying out the operation of allowing a user to perform spatial manipulations of said selected digital image further comprises program means for allowing a user to:
  (a) translate said selected digital image with respect to display;
  (b) enlarge and reduce said selected digital image with respect to said display; and
  (c) rotate said selected digital image about at least one axis with respect to said display.

11. An apparatus for comparing dynamic digital images with a transparency having an image thereon as recited in claim 7, further comprising:
  (a) program means, associated with said computer, for carrying out the operation of updating and monitoring an inventory of items corresponding to said digital image displayed on said display;
  (b) program means, associated with said computer, for carrying out the operation of downloading, to said computer, product information associated with said digital image displayed on said display; and
  (c) program means, associated with said computer, for carrying out the operation of uploading market service data from said computer.

12. An apparatus for comparing dynamic digital images with a transparency having an image thereon as recited in claim 7, wherein said transparent medium comprises a medical transparency, and said digital image on said display comprises a graphical representation of a medical implant.

13. An apparatus for comparing dynamic digital images with a transparency having au image thereon as recited in claim 12, wherein said program means further comprises means for carrying out the operations of:
  (a) pre-operative planning analysis; and
  (b) post-operative outcome analysis.

14. An apparatus for comparing dynamic digital images with a transparency having an image thereon, comprising:
  (a) a display, said display having a plurality of pixels;
  (b) a touch screen, said touch screen coupled to said display;
  (c) means for illuminating said display, said display coupled to said illuminating means;
  (d) means for superimposing said transparency with said display and for holding said transparency, said display, said touch screen and said illuminating means in a stationary relationship, with said transparency interposed between said display and said touch screen, said superimposing means further comprising means for retaining said transparency in between said display and said illuminating means and for maintaining said touch screen, said display, said transparency and said illuminating means in a stationary relationship,
  (e) a computer, said computer operatively coupled to said display, said computer operatively coupled to said touch screen, said pixels on said display responsive to said computer;
  (f) program means, associated with said computer, for generating, displaying and manipulating a digital image on said display according to input from said touch screen, said digital image on said display in superposition with said image on said transparency.

15. An apparatus for comparing dynamic digital images with a transparency having an image thereon as recited in claim 14, further comprising:

(a) a touch pad, said touch pad operatively coupled to said computer; and (b) said program means for generating, displaying and manipulating said digital image on said display being responsive to input from said touch pad.

16. An apparatus for comparing dynamic digital images with a transparency having an image thereon as recited in claim 14, wherein said means for retaining said transparency in between said display and said illuminating means and for maintaining said touch screen, said display, said transparency and said illuminating means in a stationary relationship, comprises:

(a) a transparent panel, said transparent panel coupled to said illuminating means, said transparent panel coupled to said display; and (b) said transparent panel and said display structure and configured to receive said transparent medium between said transparent panel and said display and to hold said transparent medium, said display and said illuminating means in a static relationship with respect to each other.

17. An apparatus for comparing dynamic digital images with a transparency having an image thereon as recited in claim 14, wherein said program means further comprises means, responsive to input from said touch screen and said touch pad, for carrying out the operations of:

(a) allowing a user to select a viewing mode;

(b) allowing a user to select an image;

(c) allowing a user to select a view of said selected image;

(d) allowing a user to perform spatial manipulations of said selected image with respect to said flat panel display; and (e) allowing a user to generate, display and manipulate additional images on said flat panel display.

18. An apparatus for comparing dynamic digital images with a transparency having an image thereon as recited in claim 14, further comprising:

(a) program means, associated with said computer, for carrying out the operation of updating and monitoring an inventory of items corresponding to said image displayed on said flat panel display;

(b) program means, associated with said computer, for carrying out the operation of downloading, to said computer, product information associated with said image displayed on said flat panel display; and (c) program means, associated with said computer, for carrying out the operation of uploading market service data from said computer.

\* \* \* \* \*